July 27, 1954 G. J. E. GOUBAU 2,685,068
SURFACE WAVE TRANSMISSION LINE
Filed March 21, 1950 6 Sheets-Sheet 1

INVENTOR.
BY GEORG J. E. GOUBAU
Harry M. Saragovitz
ATTORNEY

July 27, 1954 G. J. E. GOUBAU 2,685,068
SURFACE WAVE TRANSMISSION LINE
Filed March 21, 1950 6 Sheets-Sheet 2

INVENTOR.
GEORG J. E. GOUBAU
BY
Harry M. Saragovitz
ATTORNEY

INVENTOR.
GEORG J. E. GOUBAU
BY
Harry M. Saragovitz
ATTORNEY

July 27, 1954     G. J. E. GOUBAU     2,685,068
SURFACE WAVE TRANSMISSION LINE
Filed March 21, 1950     6 Sheets-Sheet 4
*Fig.9.*
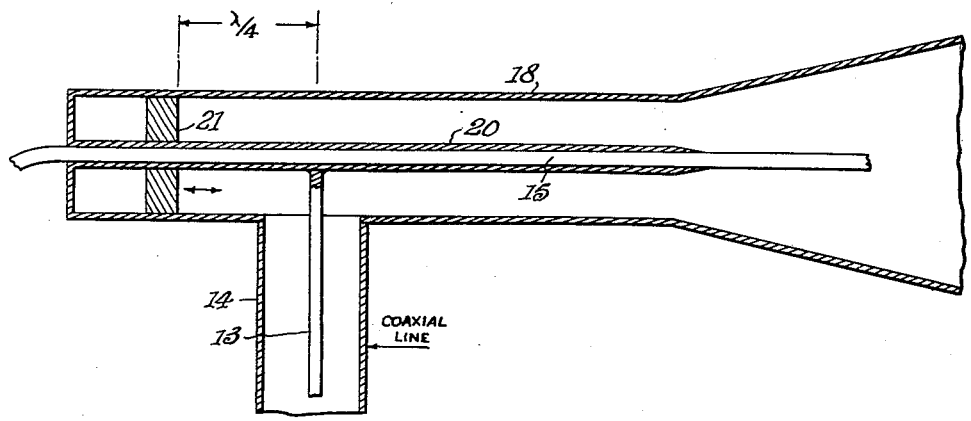
*Fig.10.*
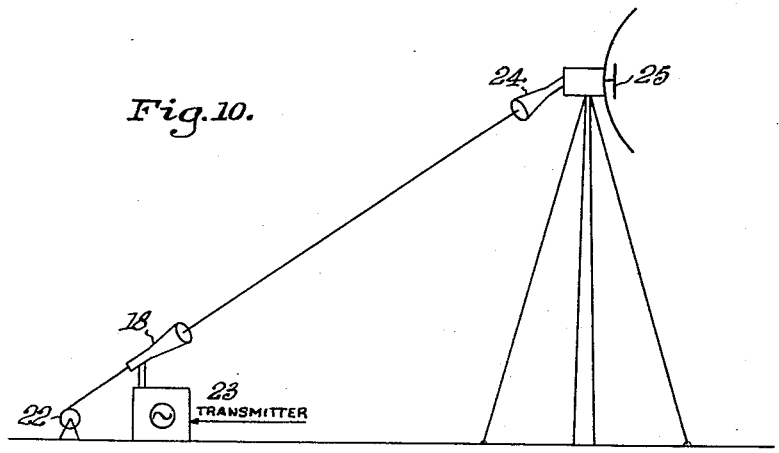
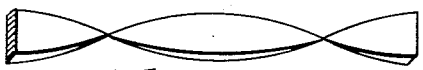
*Fig.11A.*     *Fig.11B.*
*Fig.11.*     *Fig.12.*
INVENTOR.
BY GEORG J. E. GOUBAU
Harry M. Saragovitz
ATTORNEY

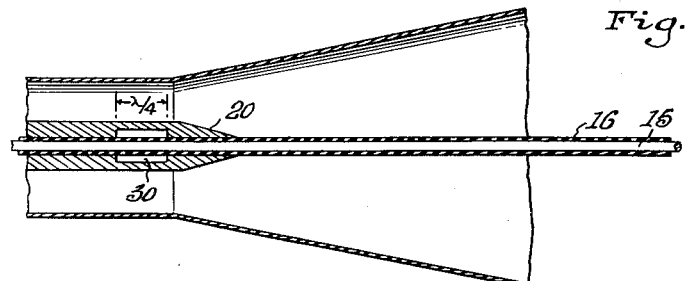
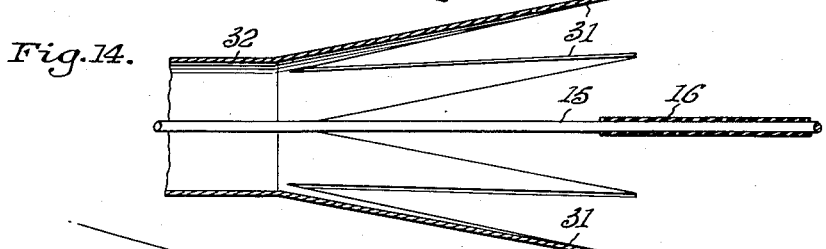
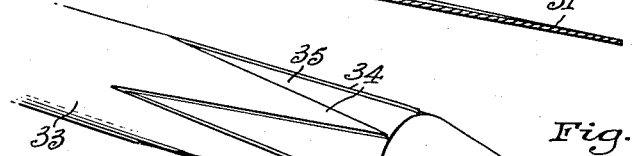
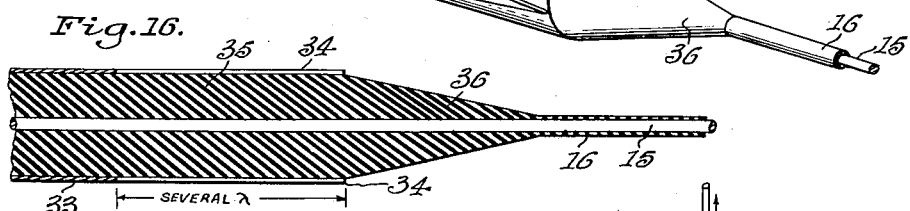
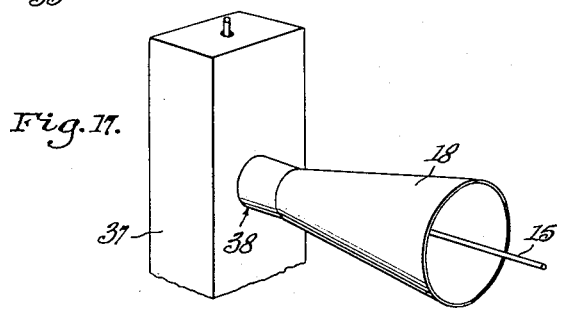
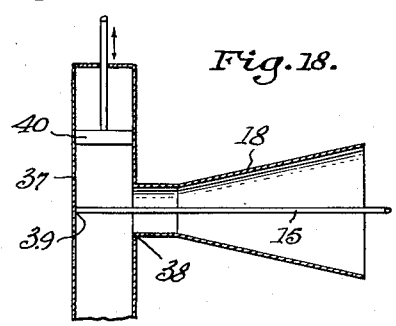
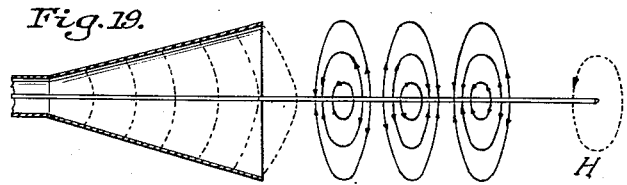
INVENTOR.
BY GEORG J. E. GOUBAU
Harry M. Saragovitz
ATTORNEY Patented July 27, 1954

2,685,068

UNITED STATES PATENT OFFICE 2,685,068

SURFACE WAVE TRANSMISSION LINE

Georg J. E. Goubau, Long Branch, N. J., assignor to Surface Conduction, Inc., a corporation of New York Application March 21, 1950, Serial No. 151,025

35 Claims. (Cl. 333—95)

(Granted under Title 35, U. S. Code (1952), sec. 266)

This invention may be manufactured and used by or for the Government for governmental purposes without the payment to me of any royalty thereon.

This invention relates to a transmission line for electromagnetic waves, being especially adapted for wave energy in the ultra-high and super-high frequency ranges.

The novel transmission line of my invention comprises elongated conductive means, such as a wire, along whose outer surface the electromagnetic energy is guided. Because the energy is propagated by surface waves I call my novel transmission line a "surface wave transmission line."

Surface waves should be distinguished from the usual waves on long wire antennas. The latter are extensively discussed in the literature. Such waves are not plane waves, and would not be plane waves even for an antenna of infinite length. The field of such waves expands more and more while it travels along the antenna away from the point where the energy is fed in to the antenna. This field is a radiation field and is similar to a guided wave only in the vicinity of the conductor. If it is considered that this type of field is a wave mode (although in fact it is an integral of an infinite number of wave modes), it may be called a "radiating mode." The surface waves which my invention is adapted to transmit may therefore be termed "non-radiating modes."

An object of my invention is to provide a surface wave transmission line comprising elongated conductive means having its outer surface conditioned, or modified, so as to reduce the phase velocity of the transmitted energy to thereby concentrate the field of the transmitted wave adjacent the conductor.

Another object of my invention is to provide a novel method of transmitting electromagnetic energy by the use of my surface wave transmission line.

A further object of my invention is to provide a transmission system operable in the frequency range above about 50 megacycles per second, and having extremely low attenuation over a very wide range of frequencies.

It is also an object of my invention to provide a transmission system which is economical to manufacture and maintain, of small size and light weight, and physically flexible and adjustable.

A further object of my invention is to provide a transmission system which is corrosion resistant and not seriously affected by adverse weather conditions.

It is a further object of my invention to provide a surface wave transmission line which may be coupled to either a hollow wave guide or a coaxial cable, to receive energy from a source or feed transmitted energy to a translating device.

Another object of my invention is to provide a surface wave transmission line in conjunction with means for exciting surface waves for propagation along the line.

A specific object of my invention is to provide a surface wave transmission line in conjunction with a launching device for exciting surface waves for transmission along the line, wherein the launching device has an aperture diameter of at least one wave length.

A further specific object of my invention is to provide a surface wave transmission line in conjunction with an electromagnetic horn, wherein movement of said line relative to the horn can be effected for adjusting the physical length of the line.

A preferred form of my invention includes a surface wave transmision line wherein an elongated conductor has its outer surface coated with a dielectric.

Other specific forms of my transmission line include an elongated conductive means which has a physically irregular outer surface.

Further objects and advantages of my invention will be apparent from the following description taken in connection with the drawings, wherein:

Figure 9 is a view similar to Figure 8, wherein is shown a slidable conductive connection between the surface wave transmission line and the inner conductor of the coaxial line.

Figure 10 illustrates one application of my invention, in which an antenna system is located at the receiving end of my novel transmission system.

Figure 11 illustrates an embodiment of my surface wave line wherein an elongated conductor is formed with external threads on its surface to reduce the phase velocity of the transmitted energy.

Figure 11A illustrates an embodiment of my surface wave line wherein the line is formed of a single non-circular conductor twisted along its length.

Figure 11B illustrates an embodiment of my surface wave line wherein the line is formed of a plurality of conductors twisted together along their length to present an irregular outer surface.

Figure 12 shows another embodiment of the line wherein the outer surface of the conductor is formed with projections, for the same purpose.

Figure 13 is a view similar to Figure 9, wherein is provided a capacitative coupling between the inner conductor of the coaxial line and the surface wave line such that the surface line conductor is slidable with respect to the horn.

Figure 14 shows one form of a direct transition from a coaxial line to the surface wave line, a segmental horn being provided.

Figures 15 and 16 show another form of a direct coupling from a coaxial line to a surface wave line, no horn being required in this arrangement.

Figure 17 is a perspective view, and Figure 18 a longitudinal sectional view, of a coupling from the surface wave line to a hollow wave guide.

Figure 19 shows schematically the launching of plane electromagnetic waves from a horn on to the surface wave line.

Figure 1:
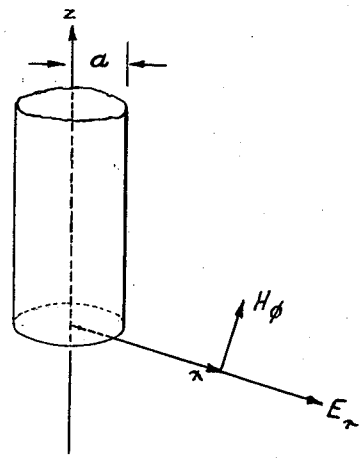
Figures 1–7 illustrate theoretical assumptions and graphical presentations of theoretical aspects helpful in understanding the basis of my invention.

In 1899, A. Sommerfeld published a theoretical paper [Annalen der Physik u. Chemie, Neue Folge, 67-1 (1899), 233], on wave propagation along an infinitely long cylindrical wire of finite conductivity. Although the attenuation of such waves is theoretically much smaller than that of waves in coaxial cables there appears to have been little consideration given to the type of wave discussed by Sommerfeld, either in the literature or with regard to a practical application.

Zenneck [Ann. Phys. 23 (1907), 846], discussed a surface wave which is guided by a plane interface separating a non-conducting medium from a conducting medium. This is to be distinguished from Sommerfeld's wave wherein the interface is cylindrical. As yet no convincing answer has been found to the question of the existence of Zenneck's surface wave, although there has been considerable discussion in the literature on the point.

Both the Sommerfeld and Zenneck surface waves are possible solutions of Maxwell's equations satisfying given boundary conditions. However, the solutions are special ones insofar as they refer to plane electromagnetic waves. Such waves could be part of assymptotic solutions which would require power sources infinitely far removed from the interface. In such cases only an infinitesimally small amount of the total power would be converted into the surface wave. These considerations may account for the lack of a practical embodiment of either the Sommerfeld or Zenneck surface waves, since the problem of providing a finite power source capable of generating either of these wave types may have seemed impossible of practical solution.

The present invention is an extremely practical solution of this problem. Using a power source of convenient dimensions, surface waves similar to those theoretically discussed by Sommerfeld can be excited for guided transmission with high efficiency.

By means of the present invention the field of the surface wave is concentrated adjacent the conductor. Therefore the physical size of the excitation and reception means for the surface waves is correspondingly smaller, and practical use of the surface waves is feasible. Preferably, the shrinking of the radial field may be accomplished by suitably modifying or conditioning the conductor surface, as will be fully described below.

*A surface wave can be transmitted along a conductor independent of its conductivity by reducing the phase velocity of the wave. This reduction in phase velocity can be accomplished by suitably modifying the surface of the conductor*

The following analysis demonstrates how suitable modification of the conductor surface will render the transmission of surface waves substantially independent of the conductivity of the conductor. The field of a surface wave on such a modified conductor does not extend as far radially as would Sommerfeld's wave. While Sommerfeld's wave on a bare conductor is constrained to the conductor only by reason of the conductor's finite conductivity, when the conductor surface is suitably modified according to my invention the phase velocity of the wave is thereby reduced and this permits the modified conductor to act as a wave guide substantially independent of its conductivity.

Considering the boundary condition for a surface wave with no dissipation, Figure 1 shows a coordinate system in conjunction with a solid cylindrical conductor of radius $a$. An unattenuated surface wave of axial symmetry propagating in the $z$ direction has the field components:

$$E_r = A\frac{h}{b}H_1^{(1)}(jbr)e^{j(\omega t - hz)}$$

$$E_z = AH_0^{(1)}(jbr)e^{j(\omega t - hz)}$$

$$H_\phi = A\frac{k^2}{\omega\mu b}H_1^{(1)}(jbr)e^{j(\omega t - hz)} \quad (1)$$

wherein $b$ is a positive real quantity defined by the equation $b^2 = h^2 - k^2$; $E_r$ is the radial component of electric field; $E_z$ is the longitudinal component of electric field; $H_\phi$ is the magnetic field component in a plane transverse to the conductor; $h$ is the propagation constant $(\alpha - j\beta)$ of the line consisting of the conductor; $k = \omega\sqrt{\mu\epsilon}$ wherein $\omega = 2\pi f$, $\mu$ is the permeability, and $\epsilon$ is the dielectric constant; and $r$ is the radial distance from the axis of the conductor.

The Hankel function $H_1^{(1)}$ for positive imaginary argument is negative real:

$$H_1^{(1)}(jbr) = -|H_1^{(1)}(jbr)| \quad (2)$$

The Hankel function $H_0^{(1)}$ for positive imaginary argument is negative imaginary:

$$H_0^{(1)}(jbr) = -j|H_0^{(1)}(jbr)| \quad (3)$$

Consequently, $E_z$ has a 90 degree phase shift with respect to $E_r$ and $H_\phi$.

The boundary conditions at the surface of a guide which propagates a wave described by (1) demand that $E_z$ and $H_\phi$, and therefore their ratio $$\left(\frac{E_z}{H_\phi}\right)_{r=a'} = \frac{\omega\mu b}{k^2}\frac{H_0^{(1)}(jba')}{H_1^{(1)}(jba')}$$

$$\simeq -j\sqrt{\frac{\mu}{\epsilon}}\frac{b^2 a'}{k}ln 0.89ba' \quad (4)$$

be continuous, $a'$ being the radius at which the internal field of the conductor and the field described by Equations 1 meet. Equation 4 states that at the surface of the guide ($r=a'$) the ratio $(E_z/H_\phi)_{r=a'}$ must be positive imaginary.

Figure 2:
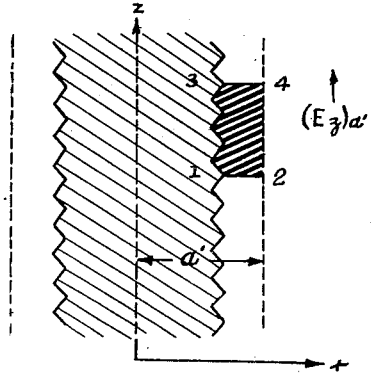

In demonstrating that the required condition of the ratio $(E_z/H_\phi)$ can be obtained by suitably modifying the surface of a perfectly conducting solid wire of substantially cylindrical shape, the following discussion will be considered with reference to Figure 2. Consider a substantially cylindrical wire which may have any microscopic structure which is periodic in the $z$ direction. A cylinder of radius $a'$ coaxial therewith surrounds the wire, and the space between the wire surface and said cylinder may be partly or wholly filled with a dielectric. This space between the wire and the cylinder should be small compared with the wave length, but sufficiently large compared with the microscopic irregularities on the wire surface so that at $r=a'$ the effect of these surface irregularities on the field is averaged out. The region bounded by the cylinder of radius $a'$ is the "guide."

With these assumptions the field in the "guide" may be considered as quasi-stationary.

The magnetic field $H_\phi$ is determined by the current $I$ in the wire. The influence of the electric field component $E_z$ on the magnetic field can be neglected.

The greater component of the electric field consists of a potential field originated by the electric charges on the wire. The lesser component of the electric field is a curl-field induced by the magnetic field.

Current $I$ and charge $Q$ per unit length are linked by the relation $$\frac{dI}{dz}+\frac{dQ}{dt}=0 \qquad (5)$$

Since the current distribution propagates in the $z$ direction with the same phase velocity as the surface wave, Equation 5 can be written $$-jhI+j\omega Q=0$$

or $$Q=\frac{h}{\omega}I \qquad (6)$$

Applying Faraday's induction law to the area 1-3-4-2 in an axial plane (Figure 2):

$$\delta z \frac{d\phi}{dt}=(E_z)_{a'}\delta z+\left(\int_1^2 E_r dr - \int_3^4 E_r dr\right) \qquad (7)$$

The length $\delta z$, like the distance 1–2, must be small compared with the wave length.

$\phi$ is the magnetic induction flux through a unit length of the area, and is proportional to $I$. In the equation $$\phi = LI \qquad (8)$$

$L$ can be considered as inductance per unit length.

$(E_z)_{a'}$ in (7) is the longitudinal electric field component at $r=a'$.

The integral of the radial component $E_r$ of electric field between the points 1 and 2 is proportional to the charge density at 1. That portion of the radial component of electric field which is induced by the magnetic field may be neglected because the dimensional irregularities on the surface of the wire are assumed to be small to be small compared with the dimensions of the area 1-3-4-2 under consideration. Hence $$\int_1^2 E_r dr = \frac{Q}{C} \qquad (9)$$

where $C$ is the capacitance per unit length.

Using the Equations 6 and 9 the difference between the two integrals in Equation 7 can be written as follows:

$$\int_1^2 E_r dr - \int_3^4 E_r dr = -\frac{1}{C}\frac{dQ}{dz}\delta z = j\frac{h^2}{\omega C}I\delta z \qquad (10)$$

Substituting Equations 8 and 10 in Equation 7:

$$j\omega LI\left(1-\frac{h^2}{\omega^2 LC}\right)=(E_z)_{a'} \qquad (11)$$

Consider now a coaxial line having the structure of the "guide" of Figure 2 inclosed in a conductive tube of radius $a'$. For such a coaxial line $(E_z)_{a'}=0$. Substituting this value of $(E_z)_{a'}$ in Equation 11 the propagation constant $h_c$ of such a coaxial line is as follows:

$$1-\frac{h_c^2}{\omega^2 LC}=0$$

or $\qquad (12)$ $$h_c^2 = \omega^2 LC$$

Therefore, in Equation 11 $\omega^2 LC$ can be expressed in terms of $h_c$, the propagation constant of a wave which would be propagated if the surface wave guide were a coaxial line which included the inner conductor and dielectric of Figure 2 and a surrounding cylindrical conductor of radius $a'$.

Thus, for the surface wave guide of Figure 2:

$$(E_z)_{a'} = j\omega LI\left(1-\frac{h^2}{h_c^2}\right) \qquad (13)$$

Since the magnetic field at $r=a'$ is $$\frac{I}{2\pi a'}$$

the ratio $(E_z/H_\phi)$ at $r=a'$ becomes:

$$\left(\frac{E_z}{H_\phi}\right)_{r=a'}=j2\pi a'\omega L\left(1-\frac{h^2}{h_c^2}\right) \qquad (14)$$

According to Equation 4, the surface wave having the magnetic and electric field components described in Equations 1 must have a ratio $(E_z/H_\phi)$ having a positive imaginary value. Hence, $h_c$ must be greater than $k$. Because $h=\sqrt{k^2+b^2}$ is greater than $k$, for the existence of a surface wave of the type (1) it is necessary that the "guide" which is inclosed in the conducting cylinder of radius $r=a'$ must form a transmission line which reduces the phase velocity of the transmitted wave below the velocity of a wave in the dielectric contained within the guide.

Any suitable modification of the conductor, or wire, which reduces the phase velocity of the transmitted wave will enable the conductor to be used as a surface wave guide. For example increasing the path on the conductor along which the wave travels can be acomplished by roughening the conductor surface or forming external threads thereon. This increase of the distance of travel of the wave results in correspondingly diminishing the velocity of propagation of the wave with respect to the axis of the conductor.

It will be noted that Sommerfeld's wave is also made possible by reducing the phase velocity, but this reduction of phase velocity is not accomplished by conditioning or modifying the surface of the conductor. Rather, in Sommerfeld it necessarily depends on the finite conductivity of the conductor, this condition of finite conductivity not being essential to the operation of the applicant's invention. This is because Sommerfeld's wave mode is mathematically described by Hankel functions whose argument is complex, i. e. containing real and imaginary components, whereas the wave mode according to my invention is described by Hankel functions whose argument is purely imaginary, disregarding losses. Therefore, in the instant invention finite conductivity is not essential for the existence of a non-radiating wave mode.

*The field of a surface wave can be concentrated adjacent the conductor by suitably modifying the conductor surface*

Having established the existence of a surface wave of the type described by Equations 1, the radial extension of this field will be investigated. In this discussion it will still be assumed that dissipation is negligible.

Assume an imaginary cylinder of radius R surrounding the wire and coaxial therewith. To determine the amount of power $N_R$ which is transmitted outside of this imaginary cylinder we use the equation $$N_R = Re\left(2\pi \int_R^\infty r E_r H_\phi^* dr\right) \quad (15)$$

wherein $Re$ symbolizes the real component only of the transmitted power is included, the asterisk * denoting the conjugate complex quantity. Substituting the values given by Equations 1 for $E_r$ and $H_\phi$, since $H_1^{(1)}(jbr)$ is real $$N_R = 2\pi A A^* \sqrt{\frac{\epsilon}{\mu}} \frac{hk}{b^2} \int_R^\infty r[H_1^{(1)}(jbr)]^2 dr \quad (16)$$

Since, for any quantity $x$, $$\int x[H_1^{(1)}(x)]^2 dx =$$
$$\frac{x^2}{2}\left\{[H_1^{(1)}(x)]^2 + [H_0^{(1)}(x)]^2 - \frac{2}{x}H_0^{(1)}(x)H_1^{(1)}(x)\right\} \quad (17)$$

$N_R$ becomes $$N_R = A A^* \pi \sqrt{\frac{\epsilon}{\mu}} \frac{hk}{b^4} F(bR) \quad (18)$$

where $$F(bR) = (bR)^2\left\{-\frac{2}{bR}jH_0^{(1)}(jbR)H_1^{(1)}(jbR) - [H_0^{(1)}(jbR)]^2 - [H_1^{(1)}(jbR)]^2\right\} \quad (19)$$

By reference to a table of Hankel functions with imaginary argument the function $F(bR)$ can be calculated.

In the range $(bR)<0.1$ the Hankel functions can be approximated by their zero developments with good accuracy. Thus $F(bR)$ becomes $$F(bR) \simeq \frac{8}{\pi^2}(-ln0.89bR - 0.5) \text{ for } (bR)<0.1 \quad (20)$$

Figure 3:
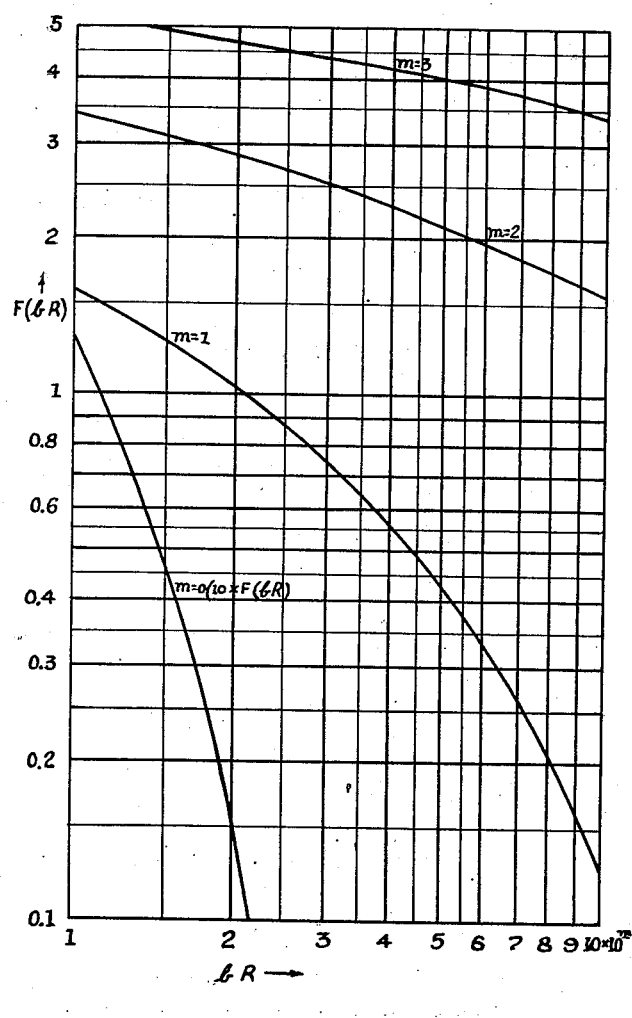

As thus computed, the function $F(bR)$ is plotted in Figure 3. The parameter $m$ indicates the decade in $(bR)$ to which the curve refers. For $m=0$ the function $10 \times F(bR)$ has been plotted in order that this curve will appear on the diagram. For the other values of $m$, the function $F(bR)$ has been plotted.

The circle of radius $R_p$ within which travels a certain percentage $p$ of the total power of the surface wave is given by the equation $$p = 1 - \frac{F(bR)}{F(ba')} \quad (21)$$

wherein $F(ba')$ is determined in the same manner as $F(bR)$ by substituting the value of $a'$ in place of R in the formulas above.

Figure 4:
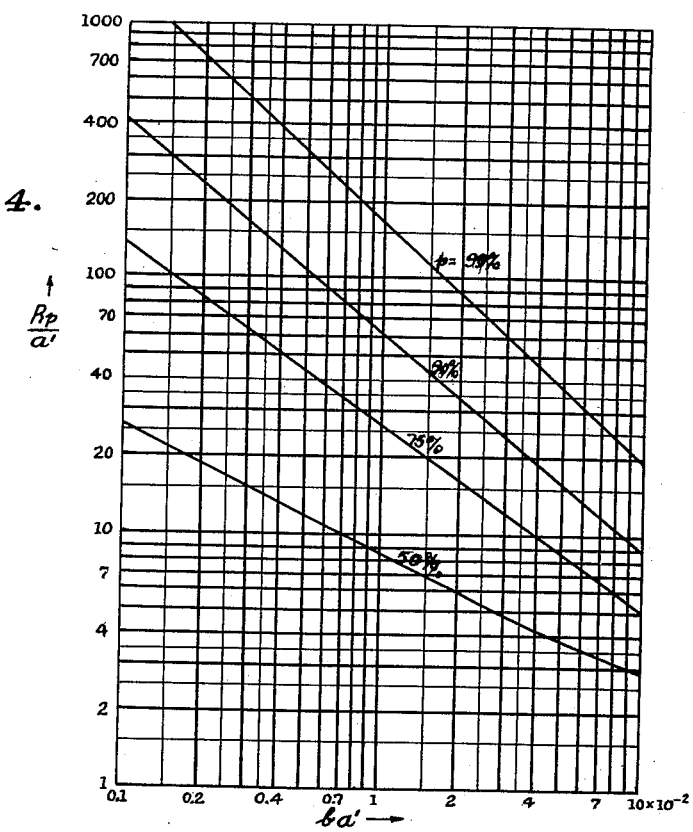

Figure 4 shows the ratio $R_p/a'$ as a function of $(ba')$ for $p=50\%$, $75\%$, $90\%$ and $99\%$. For a given diameter $a'$ of the guide the field becomes more concentrated adjacent the guide as $b$ increases. $b$ can be varied by modifying the conductor surface. Thus, by modifying the conductor surface it is possible to substantially restrict the radial extent of the field so that most of the energy is concentrated adjacent the guide.

Figure 6:
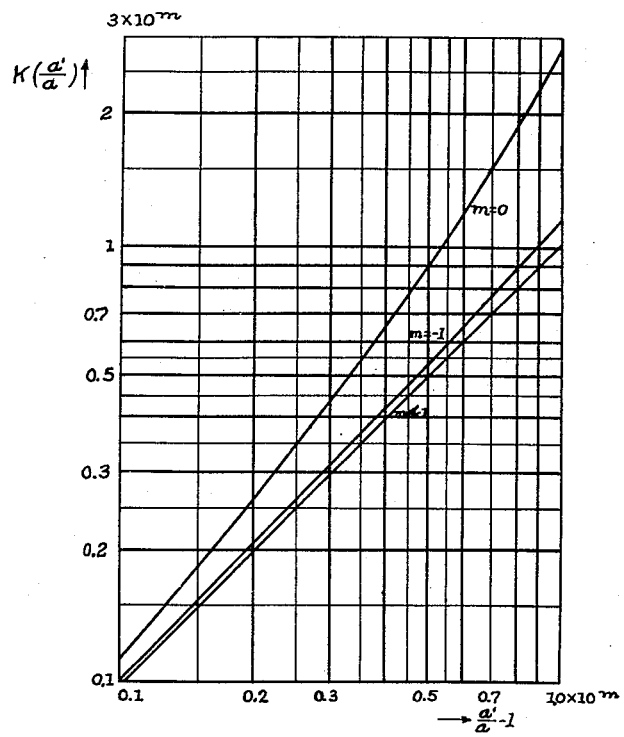

A portion of the energy travels in the dielectric between the conductor surface and $a'$, the outer extremity of the guide (Figure 6). However, this part is so small within the considered range of $b$ that it is negligible.

*A dielectric coating on a perfect conductor will reduce the phase velocity and concentrate the field of the wave adjacent the guide*

The simplest method for reducing the phase velocity, and the radial extent of the field, of the surface wave is to apply a dielectric coating to the conductor. This case will be considered in detail, still assuming that dissipation is negligible.

The field in the dielectric layer can be described by Bessel functions $J_0$, $J_1$, and Neumann functions $N_0$, $N_1$:

$$E_{r_d} = j\frac{h}{b_d}[A_d J_1(b_d r) + B_d N_1(b_d r)]e^{j(\omega t - hz)}$$

$$E_{z_d} = [A_d J_0(b_d r) + B_d N_0(b_d r)]e^{j(\omega t - hz)}$$

$$H_{\phi_d} = j\frac{k_d^2}{\omega \mu_d b_d}[A_d J_1(b_d r) + B_d N_1(b_d r)]e^{j(\omega t - hz)} \quad (22)$$

with $$b_d^2 = k_d^2 - h^2 \quad (23)$$

and $$k_d = \omega\sqrt{\epsilon_d \mu_d} \quad (24)$$

The subscript $d$ indicates that these symbols so subscribed refer to the dielectric layer.

Let $a$ be the radius of the conductor and $a'$ the radius to the outer surface of the guide. Then we obtain from the boundary condition $E_z=0$ for a conductor of infinite conductivity, $$\frac{A_d}{B_d} = -\frac{N_0(b_d a)}{J_0(b_d a)} \quad (25)$$

and the ratio $E_z/H_\phi$ at the outer surface of the dielectric coating $(r=a')$ becomes $$\left(\frac{E_z}{H_\phi}\right)_{r=a'} =$$
$$-j\sqrt{\frac{\mu_d}{\epsilon_d}} \frac{b_d}{k_d} \frac{J_0(b_d a')N_0(b_d a) - J_0(b_d a)N_0(b_d a')}{J_1(b_d a')N_0(b_d a) - J_0(b_d a)N_1(b_d a')} \quad (26)$$

This equation can be simplified if we are interested only in conditions wherein the phase velocity of the surface wave is only slightly reduced. Such conditions are established if: (1) the dielectric layer is thin compared with the radius of the conductor, or (2) the dielectric layer is of the same order of magnitude as the conductor radius but the radius itself is very small with respect to the wavelength of the transmitted wave.

In the first case, we can write $$J_0(b_d a) \simeq J_0(b_d a') + b_d J_1(b_d a')(a'-a) \quad (27)$$

and $$N_0(b_d a) \simeq N_0(b_d a') + b_d N_1(b_d a')(a'-a) \quad (28)$$

With these relations, Equation 26 becomes $$\left(\frac{E_z}{H_\phi}\right)_{r=a'} \simeq j\sqrt{\frac{\mu_d}{\epsilon_d}} \frac{b_d^2}{k_d}(a'-a) \quad (29)$$

In the second case, we can use the zero representations of the cylinder functions:

$$[J_0(x)]_{x \to 0} \simeq 1 \quad (30)$$

$$[J_1(x)]_{x \to 0} \simeq \frac{x}{2} \quad (31)$$

$$[N_0(x)]_{x \to 0} \simeq \frac{2}{\pi} \ln 0.89x \quad (32)$$

$$[N_1(x)]_{x \to 0} \simeq -\frac{2}{\pi x} \quad (33)$$

Thus, Equation 26 becomes $$\left(\frac{E_z}{H_\phi}\right)_{r=a'} \simeq j\sqrt{\frac{\mu_d}{\epsilon_d}} \frac{b_d^2}{k_d} a' \ln\frac{a'}{a} \quad (34)$$

Both Equations 29 and 34 are immediately obtained from Equation 14.

If the guide, shown in Figure 2, consisting of conductor and dielectric layer is considered to be surrounded by a metal tube of radius $a'$ then the inductance $L$ per unit length and the propagation constant $h_c$ of the coaxial line formed by so changing the guide may be represented as follows:

$$L = \frac{\mu_d}{2\pi} \ln\frac{a'}{a} \quad (35)$$

$$h_c = \omega\sqrt{\epsilon_d \mu_d} = k_d \quad (36)$$

Substituting these quantities in Equation 14 gives $$\left(\frac{E_z}{H_\phi}\right)_{r=a'} = j2\pi a' \frac{\omega \mu_d}{2\pi} \ln\frac{a'}{a}\left(1 - \frac{h^2}{k_d^2}\right) = j\sqrt{\frac{\mu_d}{\epsilon_d}} \frac{b_d^2}{k_d} a' \ln\frac{a'}{a} \quad (37)$$

This equation is identical with Equation 34.

Because Equation 14 is valid also for large $a$ (conductor radius), provided the dielectric layer is so thin that $E_z$ is small compared with $E_r$, Equation 37 should become identical with Equation 29 if $$\frac{a'-a}{a'} \ll 1$$

This is indeed the case because $$\ln\frac{a'}{a} = \ln\left(1 + \frac{a'-a}{a}\right) \simeq \frac{a'-a}{a} \simeq \frac{a'-a}{a'} \quad (38)$$

Hence, we consider Equation 37 as the more general formula.

At $r = a'$ where the field in the guide and the field of the surface wave meet, the ratio $E_z/H_\phi$ must be continuous. Hence, by comparing Equations 4 and 37 we get the relation:

$$\sqrt{\frac{\mu}{\epsilon}} \frac{b^2}{k} a' \ln 0.89 ba' = -\sqrt{\frac{\mu_d}{\epsilon_d}} \frac{b_d^2}{k_d} a' \ln\frac{a'}{a} \quad (39)$$

from which the ratio $a'/a$ is determined $$\ln\frac{a'}{a} = -\frac{\epsilon_d}{\epsilon} \frac{b^2}{b_d^2} \ln 0.89 ba' \quad (40)$$

Since $$b_d^2 = k_d^2 - h^2 = k_d^2 - k^2 - b^2$$

(see Equations 23 and 27), and $$b^2 \ll k^2$$

Equation 40 becomes for $\mu_d = \mu$:

$$\ln\frac{a'}{a} \simeq \frac{\epsilon_d}{\epsilon_d - \epsilon}\left(\frac{\lambda}{a'}\right)^2 G(ba') \quad (41)$$

with $$G(ba') = -\left(\frac{ba'}{2\pi}\right)^2 \ln 0.89 ba' \quad (42)$$

Figure 5:
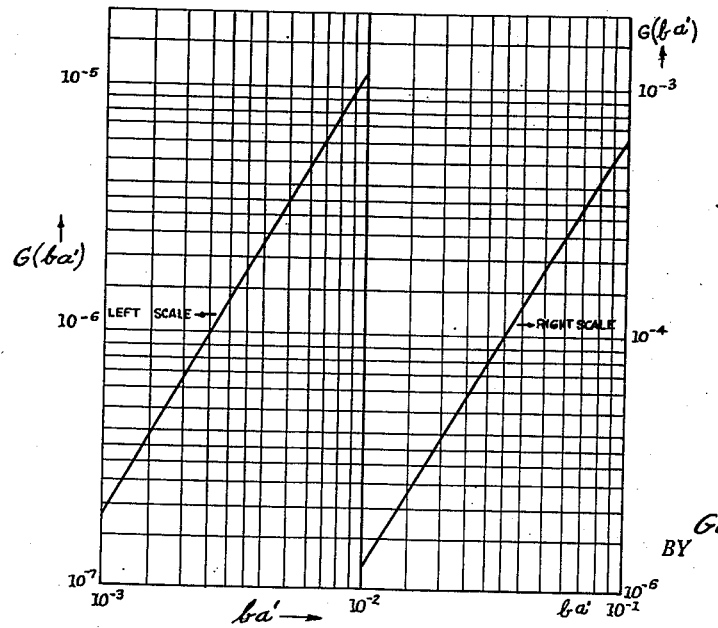

The function $G(ba')$ is plotted in Figure 5.

*Sample computation of required dielectric thickness*

Consider the following example wherein $a = 1$ cm. and the wavelength $\lambda = 50$ cm. In order to concentrate 90% of the power transmitted by the surface wave within a radius of 50 cm. from the center of the conductor ($R_{90\%} = 50$ cm.) what thickness of the dielectric layer is required if $$\frac{\epsilon_d}{\epsilon} = 4?$$

From Figure 4 we obtain the value of $(ba')$ for which $R_{90\%} = 50$ cm. It is $ba' = 1.21 \times 10^{-1}$ cm. The corresponding value for $G(ba')$ is found by means of Figure 5 to be $G(ba') = 6.68 \times 10^{-5}$. Inserted in Equation 29 these values give $$\frac{\epsilon_d - \epsilon}{\epsilon_d}\left(\frac{a'}{\lambda}\right)^2 \ln\frac{a'}{a} = 1.68 \times 10^{-5}$$

$$\frac{a'-a}{a} \simeq 5.6 \times 10^{-2}$$

The radius of the wire becomes $a = 0.944$ cm. and the thickness of the dielectric 0.056 cm.

In general, the radius $a$ of the conductor will be given instead of $a'$. In such cases, $$\left(\frac{a'}{a}\right)^2 \ln\frac{a'}{a}$$

may first be determined from the equation $$\left(\frac{a'}{a}\right)^2 \ln\frac{a'}{a} = \frac{\epsilon_d}{\epsilon_d - \epsilon}\left(\frac{\lambda}{a}\right)^2 G(ba') = K\left(\frac{a'}{a}\right) \quad (43)$$

Then $$\left(\frac{a'}{a} - 1\right)$$

is determined from Figure 6 which shows $$K\left(\frac{a'}{a}\right)$$

as a function of $$\left(\frac{a'}{a} - 1\right)$$

*Amount of power transmitted within the dielectric coat*

The power transmitted within the guide, i. e., within the dielectric coat since a perfect conductor is assumed, is determined as follows:

$$N_d = 2\pi \int_a^{a'} r E_r H_\phi^* dz \quad (44)$$

$E_r$ and $H_\phi$ in terms of current are:

$$E_r = \frac{Q}{2\pi \epsilon_d} = \frac{h}{2\pi \epsilon_d \omega r} I \quad (45)$$

$$H_\phi = \frac{I}{2\pi} \quad (46)$$

Hence:

$$N_d = \frac{h}{2\pi \omega \epsilon_d} I I^* \int_a^{a'} \frac{1}{r} dr \quad (47)$$

The power N of the surface wave itself is given by Equation 18 with $R=a'$.

For $F(ba')$ the approximation (20) can be used. Thus:

$$N \simeq -\frac{8}{\pi} AA^* \sqrt{\frac{\epsilon}{\mu}} \frac{hk}{b^4}(ln 0.89ba' + 0.5) \quad (48)$$

Using the third equation of (1), A can be expressed as $(H_\phi)_{a'}$ and since $$(H_\phi)_{a'} = \frac{I}{2\pi a'}$$

$$AA^* = II^* \frac{\omega^2 \mu^2 b^2}{4\pi^2 (a')^2 k^4 |H_1^{(1)}(jba')|^2} \simeq II^* \frac{\mu b^4}{16\epsilon k^2} \quad (49)$$

With Equations 47 and 49 the ratio between $N_d$ and $N$ becomes:

$$\frac{N_d}{N} = -\frac{\epsilon}{\epsilon_d} \frac{ln\frac{a'}{a}}{ln 0.89ba' + 0.5} \quad (50)$$

Replacing $$ln\frac{a'}{a}$$

according to the Equation 40 gives:

$$\frac{N_d}{N} = \frac{b^2}{k^2\left(\frac{\epsilon_d - \epsilon}{\epsilon}\right) - b^2} \frac{ln 0.89ba'}{ln 0.89ba' + 0.5} \quad (51)$$

Since this development is based on the assumption that the longitudinal component of electric field $E_z$ is small compared with the radial component $E_r$, it is evident from Equation 1 that $b = \sqrt{h^2 - k^2}$ is small compared with $k$ and $h$. Therefore the ratio $N_d/N$ is very small.

The power of the internal field, i. e., the power transmitted within the dielectric, can be neglected if $b < 0.1$, because such internal power $N_d$ amounts to less than 2% of the total power transmitted $N$ for the usual dielectric materials, for which $\epsilon_d/\epsilon > 2$.

*Power loss in a conductor of finite conductivity having a dielectric coating*

The preceding discussion is directed to a surface wave guide wherein a perfect conductor has its surface modified. In the analysis for a modified conductor of finite conductivity, the effect of dissipation can be calculated in the usual manner with the assumption that the field distribution in an equiphase plane is approximately the same as in the case of a dissipationless conductor. This means that the losses are calculated for the undisturbed field.

The case of a conductor with a dielectric layer will be considered. The power loss in such a conductor from a point $z$ along its length to a further point along the conductor at $z+dZ$ will be calculated. The power loss within this path is proportional to the total power $(\overline{N} = N + N_d)$ at point Z:

$$d\overline{N} = -2\beta \overline{N} dz \quad (52)$$

where $\beta$ is the attenuation factor in neper/cm.

The power loss $d\overline{N}$ consists of two parts: the conductivity loss and the dielectric loss. The conductivity loss, expressed in terms of current I in the conductor, is given by:

$$d\overline{N}_c = -\frac{1}{2\pi a}\sqrt{\frac{\omega \mu_c}{2\sigma_c}} II^* dz \quad (53)$$

where $\mu_c$ and $\sigma_c$ are the permeability and conductivity, respectively, of the conductor.

The dielectric loss is $$d\overline{N}_d = -\frac{h^2}{2\pi \omega \epsilon_d} ln\frac{a'}{a} \tan \delta II^* dz$$

$$\simeq \frac{h^2}{2\pi \omega \epsilon} \frac{b^2}{b_d^2} \tan \delta ln 0.89ba' II^* dz \quad (54)$$

wherein tan $\delta$ is the loss factor of the dielectric material.

The total power $(\overline{N} = N + N_d)$ transmitted along the guide is obtained from Equations 48, 49, and 50:

$$\overline{N} = -\frac{1}{2\pi}\sqrt{\frac{\mu}{\epsilon}} \frac{h}{k}\left[1 + \frac{b^2}{b_d^2}\right] ln 0.89ba' + 0.5\} II^* \quad (55)$$

Equations 52, 53, and 55 give the attenuation factor $\beta_c$ due to conductivity losses and the attenuation factor $\beta_d$ due to dielectric losses:

$$\beta_c = -\frac{1}{2a}\sqrt{\frac{\omega \epsilon \mu_c}{2\sigma_c \mu}} \frac{1}{ln 0.89ba' + 0.5} \text{ neper/cm.} \quad (56)$$

$$\beta_d = \frac{1}{2}\frac{h^2}{k}\frac{b^2}{b_d^2}\left(1 - \frac{0.5}{ln 0.89ba' + 0.5}\right)\tan \delta$$

$$\simeq \frac{1}{2}\frac{\epsilon}{\epsilon_d - \epsilon}\frac{b^2}{k}\left(1 - \frac{0.5}{ln ba' + 0.38}\right)\tan \delta \text{ neper/cm.} \quad (57)$$

With Equations 56 and 57 the total transmission loss in db per 100 feet becomes $$\text{Loss}_{100 \text{ ft.}} = \frac{P(ba')}{a\sqrt{\lambda}} + \frac{\epsilon}{\epsilon_d - \epsilon}\tan \delta \frac{\lambda}{(a')^2} Q(ba') \quad (58)$$

with $$P(ba') = -1.33 \times 10^4 \sqrt[4]{\frac{\epsilon}{\mu}} \sqrt{\frac{\pi \mu_c}{\sigma_c \mu}} \frac{1}{ln ba' + 0.38} \quad (59)$$

$$Q(ba') = 2.11 \times 10^3 \left(1 - \frac{0.5}{ln ba' + 0.38}\right)(ba')^2 \quad (60)$$

For a coated copper wire stretched in air $$P(ba') = 1.60 \frac{-1}{ln ba' + 0.38} \quad (61)$$

Figure 7:
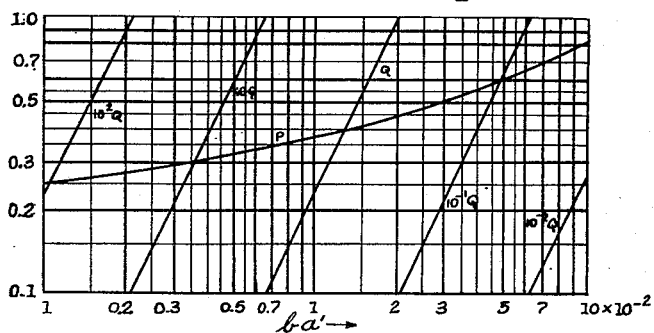

The functions $P(ba')$ for copper and $Q(ba')$ are plotted in Figure 7. Considering the preceding sample problem, the values given and computed therein are as follows: $\lambda = 50$ cm., $a' = 1$ cm., $\epsilon_d/\epsilon = 4, ba' = 1.21 \times 10^{-1}$, and $a = 0.94$ cm. Using this value of $(ba')$ from Figure 7 we obtain: $P = 0.38$ and $Q = 0.29$. The total power loss due to conductivity is given by the first term in Equation 58:

$$\text{Loss}_{c_{100 \text{ ft.}}} = \frac{1}{0.94}\frac{0.38}{\sqrt{50}} = 0.057 \text{ db}$$

Assuming tan $\delta = 10^{-3}$, the dielectric loss is given by the second term of Equation 58 as follows:

$$\text{Loss}_{d_{100 \text{ ft.}}} = \frac{1}{4-1} \times 10^{-3} \times \frac{50}{1} \times 0.29 = 0.005 \text{ db}$$

The total loss per 100 feet of the guide becomes 0.062 db.

It will be noted from Figure 4 that using this guide 50% of the energy will be transmitted within a radius of 7.6 cm. from the axis of the conductor, and 75% of the energy within a radius of 22.5 cm.

*Wave energy coupling from coaxial line to the surface wave line*

The preceding discussion having been limited to the modified conductor per se, attention is now drawn to the following disclosure of practical, operative means for coupling electromagnetic wave energy to the modified conductor.

Figure 8:
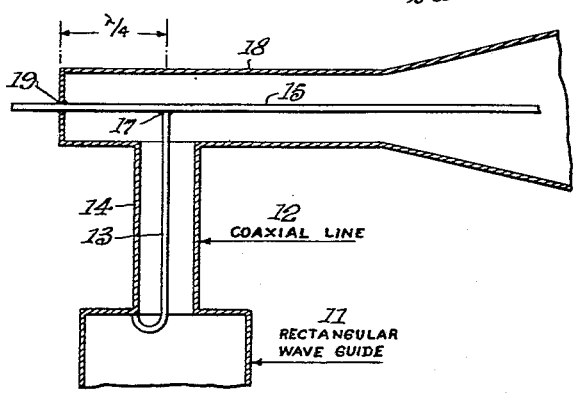
Figure 8 is a fragmentary longitudinal sectional view of one form of my invention employing a horn, and a fixed conductive connection between the surface wave transmission line and the inner conductor of a coaxial line coupled to the energy source.

In Figure 8 there is shown one arrangement for coupling the coated conductor to a source of transmission. The signal energy may be fed in by means of a conventional hollow wave guide 11 to which is coupled a coaxial line 12. In this view the wave guide is rectangular in cross-section, and coupling to the coaxial line is effected by joining the looped end of inner conductor 13 of the coaxial line to the guide. Such a coupling arrangement is well known in the art, being shown in "Fields and Waves in Modern Radio" by Ramo and Whinnery, page 366, Fig. 9.11c, and is intended for illustration purposes only, without any intent to limit the present invention thereto.

The inner conductor 13 of the coaxial line extends through an aperture in the tubular rear portion of electromagnetic horn 18 and is connected at its other end to the conductor 15 which forms the surface wave guide. This connection 17 may be soldered, or a suitable clamp arrangement may be provided.

The outer coaxial line conductor 14 is connected to the tubular portion of the electromagnetic horn 18, this connection enclosing the bottom aperture formed in the horn. A quarter wavelength trap behind connection 17 permits the conductor 15 to extend beyond the rear end of the horn. A suitable soldered or clamp connection between the conductor 15 and the horn is provided at 19 to help fixedly position conductor 15 with respect to the horn.

Within the horn the surface line conductor 15 may be totally or partially bared for convenience in forming the conductive connections 17 and 19. The horn itself defines the outer limits or beam of the field of the wave, and hence no modification of the surface of that portion of conductor 15 within the horn is necessary to concentrate the fields adjacent said conductor. Beyond the mouth of the horn the conductor surface is modified, such as by having a dielectric coating, in order to shrink the radial extent of the fields by reducing the velocity of propagation of the transmitted energy.

Figure 19 shows schematically the launching or beaming of waves from the horn onto the conductor having a modified surface. In this figure the conductor is bared within the horn. In order to minimize losses due to such a launching system, and also in order to produce a non-radiating mode, the field distribution of the waves along the open line must be simulated as closely as possible within the horn. Therefore, the shape and dimensions of the horn must be considered.

Within the tapered horn, with the conductor being bared within the horn, the surfaces of equal phase are more or less spherical. At the mouth of the horn the wave front should be plane for a good field match to the open line. Therefore, the taper of the horn should be small; otherwise, the match is less perfect and the efficiency is thereby reduced. Also, the mouth or opening of the horn should not greatly exceed the area within which the $$\frac{1}{r}$$

approximation for field strength decrease holds true. Otherwise, the effective area of the horn is reduced, and the horn is less efficient.

For a surface wave transmission system especially adapted for a very wide range of frequencies it is desirable to use a horn having a non-linear taper. Adjacent the mouth of the horn the angle of taper is larger than at the rear of the tapered portion. For the higher frequencies a small angle of taper is required for good matching, whereas for the lower frequencies a wider mouth is necessary. Therefore, a non-uniformly tapered horn having a small angle of taper at its rear and a wide mouth is especially well adapted for both higher and lower frequencies without the horn being excessively long.

If the conductor within the horn is modified then it is possible to build up gradually within the horn the same wave as appears on the open conductor. The modified conductor tends to concentrate the field within the horn and toward the mouth of the horn the field is mainly determined by the surface modification of the conductor rather than by the horn.

In place of the fixed connections 17 and 19 of Figure 8, sliding contacts may be provided, thereby permitting the physical length of the surface wave guide line to be varied. Such an arrangement is shown in Figure 9. Within the tubular portion of the horn, the inner coaxial conductor 13 is connected to a metallic cylinder 20 which encloses and contacts the surface wave guide conductor 15. This arrangement provides a conductive energy coupling between the inner coaxial conductor 13 and the surface wave guide line 15 and permits sliding movement of line 15 with respect to the horn. The free end of line 15 extends beyond the rear end of the horn and may be wound around a rotatable drum. Such a drum, or any other suitable means, may be employed to provide a convenient mechanical arrangement for controlling the physical length of the surface wave line 15.

A slidable short circuiting stub 21 provides a quarter wave length trap which is adjustable for different frequencies of operation. As is well understood by those skilled in the art, a quarter wave length trap such as shown in Figure 8 (fixed) or Figure 9 (adjustable) introduces no mismatch into the main energy transmission circuit.

At the receiver, the arrangement for uncoupling the transmitted energy from conductor 15 is identical with the set-up at the transmitter. A tapered electromagnetic horn and coaxial line at the receiving end serve to transfer the wave energy to the desired apparatus. It will be understood that at the receiving end that portion of the wave energy will be received which travels within the area of the mouth of the receiving horn. Wave energy traveling outside this area will be lost.

It will also be understood that in the arrangement of Figure 9 no dielectric coating, or other surface modification for reducing the phase velocity, need be provided on that portion of the surface wave conductor which lies within the horn.

If desired, at the mouth of the horn in either Figure 8 or Figure 9, there may be provided a cover in the form of a dielectric plate extending across the mouth and having a central hole for the passage of the surface wave conductor therethrough. The advantages of such a cover are two-fold: first, it protects the interior of the horn from adverse weather conditions, such as rain; and second, it centers the surface line conductor with respect to the horn. No measurable losses are introduced into the system by adding such a cover to the horn.

The efficiency of a launching horn such as shown in Figure 8 or Figure 9 can be calculated with reasonable accuracy if the mouth of the horn does not greatly exceed the area within which the field decreases with $$\frac{1}{r}$$

If the parameter $b$ and the radius $a'$ of the open wave guide are known, then $F(ba')$ can be obtained. Knowing $R_H$, the radius of the horn at the open end, the $F(bR_H)$ can be obtained from Figure 3. The efficiency of the horn is given by $$1 - \frac{F(bR_H)}{F(ba')}$$

Instead of a conductive coupling between the surface wave conductor 15 and the inner conductor of the coaxial line, a capacitative coupling may be used. As shown in Figure 13, the surface line conductor 15 within the horn has a dielectric coating 16 on its surface. A substantially cylindrical conductive tube 20 which extends centrally along the length of the tubular portion of the horn snugly encompasses the coated conductor 15. An annular interior recess 30 is formed within tube 20. Recess 30 extends one-quarter wave length along the surface wave conductor, and forms a capacitative energy coupling between tube 20 and surface wave line 15. Tube 20 may be conductively connected to the inner conductor of a coaxial line, as shown in Figure 9.

Figure 10 shows schematically one embodiment of the overall system wherein an antenna is provided at the receiving end. From transmitter 23 the waves are fed to surface wave conductor 15 by means of a coaxial line and electromagnetic horn coupling as described above. At the receiving end, an identical horn 24 and coaxial line arrangement is used to feed the wave energy to the antenna 25 from which it is radiated. In this antenna feed system a rotatable drum 22 may be provided for controlling the physical length of the surface wave conductor. The capacitative coupling of Figure 13 is especially well adapted for this arrangement of adjusting the physical length. The advantages of this arrangement will be obvious especially when one considers the problem of an antenna mounted on a tower which vibrates in the wind. With such a set-up an antenna feed according to my invention is readily adjustable in length to accommodate the antenna movements caused by the wind. Further, the efficiency of the antenna feed system shown in Figure 10 has been found to be greater than that of a hollow wave guide antenna feed.

In place of a conical horn as shown in Figures 8, 9, 10 and 13, a segmental horn unitary with the coaxial line may be used. Figure 14 shows such a horn in which triangular metal segments 31 define the tapered portion of the horn. With such an arrangement a direct transition from a coaxial line can be made since segments 31 are simply the continuation of the outer conductor 32 of the coaxial line. Surface line conductor 15 is a continuation of the inner conductor of the coaxial line, with the air space between the inner and outer conductors serving as a dielectric of the coaxial line. Tapered segments 31 are several wavelengths long and may be formed by cutting out triangular pieces from the end of outer conductor 32, and then bending outwardly the remaining segments 31 to form the flared horn. Obviously, the segments 31 could be made rectangular in shape by simply cutting outer coaxial conductor 31 along several lines about its periphery, preferably parallel to its axis, and then bending the segments outwardly to form the flared horn.

A segmental horn may also be formed by securing a plurality of metal rods or sheets of desired shape to the end of the outer coaxial conductor, such that these metal rods or sheets taper outwardly forward of their attachment to the outer coaxial conductor.

The surface wave conductor 15 need have its surface modified, such as by dielectric coating 16, only beyond the segmental horn, similar to the embodiments in which a whole or unsegmented metal horn is used. Likewise, if the surface modification of conductor 15 consists of a dielectric coating then it is desirable to have extra thickness of the dielectric immediately in front of the horn, as is also the case for a whole or unsegmented horn.

Figures 15 and 16 show another arrangement for a direct transition from a coaxial line to the surface wave line. In this embodiment, no tapered horn portion is used. The coaxial line is formed by outer conductor 33, dielectric material 35, and inner conductor 15. A plurality of fingers 34, here shown as triangular in shape, preferably extend several wave lengths and form the end of outer conductor 33. Beyond the end of fingers 34 the dielectric material is gradually tapered, as shown at 36, inwardly toward conductor 15 until only the dielectric thickness 16 needed for surface wave transmission remains on conductor 15. The tapered dielectric section 36 preferably extends several wave lengths of the transmitted energy thus permitting gradual expansion of the axially directed energy flow.

*Coupling from hollow wave guide to surface wave line*

Figures 17 and 18 illustrate one method of coupling the surface wave line directly to a hollow wave guide. The hollow wave guide 37, here shown as rectangular, is formed with an aperture 38 in one wall. Horn 18 is secured to the wave guide around this aperture, and surface wave conductor 15 extends through the aperture and is conductively connected at 39 to the opposite wall of the hollow wave guide. An adjustable reflecting member 40 is snugly mounted within the hollow wave guide adjacent aperture 38 to form a quarter wave length trap for matching purposes.

It will be understood that, instead of extending conductor 15 through aperture 38 for connection to the hollow wave guide, a conductive tube such as shown at 20 in Figures 9 and 13 could form the conductive connection to the hollow wave guide. Either a conductive coupling between tube 20 and surface wave conductor 15 could be provided, as shown in Figure 9, or a capacitative coupling employed, as shown in Figure 13.

*Modifications of surface wave conductor other than dielectric coating*

As mentioned above, other modifications of the conductor surface can be used to reduce the phase velocity of the transmitter wave and thereby concentrate the field adjacent the conductor.

One such alternative modification is shown in Figure 11. External threads are formed on the conductor surface to thereby accomplish the desired phase velocity reduction.

This can also be done by forming alternate projections and depressions in the conductor surface along its length, as shown in Figure 12.

The same result is attainable by merely roughening the surface of the conductor, or by forming the line of a single non-circular conductor twisted along its length as shown in Figure 11A, or by forming the line of a plurality of conductors twisted together along their length to present an irregular outer surface of the line as shown in Figure 11B.

While a detailed analysis has been given only for a conductor which is circular in cross-section and a conical horn, this invention is not restricted to those specific embodiments. For different cross-sectional shapes of the conductor the field distribution of the transmitted wave would not be substantially different. Therefore, a conical horn would be used with non-cylindrical surface wave lines.

In the use of my novel transmission system in which a horn is used to launch or receive the waves, it has been found that a metal or dielectric housing enclosing the horn and part or all of the surface wave line introduces no serious deleterious effects. However, where the open line passes through the housing the aperture in the housing should be at least approximately as large as the mouth of the horn.

*Comparison with coaxial cable and hollow wave guide*

Coaxial cables and hollow wave guides are commonly used today for transmission of electromagnetic energy at high frequencies.

The chief disadvantage of the coaxial cable lies in the relatively high attenuation, the losses increasing greatly as the frequency is raised. My invention is notably a more efficient transmission medium than the coaxial cable, as will be apparent from the following test made with the arrangement of Figure 9 results in which a single surface wave transmission set-up was operated over a wide frequency range.

The length of the line between horns was 120 feet and the operating frequency ranged between 1600 megacycles per second and 4700 megacycles per second. The wire diameter was 0.080 inch and the enamel thickness was 0.002 inch. The outer diameter of cylinder 20 was 0.25 inch, and the inner diameter of the cylindrical portion of the horn was 0.63 inch. From the connection between inner coaxial conductor 13 and cylinder 20 the cylindrical portion of the horn extended 3.5 inches. At this point the horn tapered outwardly, the axial length of this tapered section being 22 inches. The diameter of the outer end of the tapered section was 13 inches. Using this set-up the actual measured losses were for 1600 megacycles per second, 2.2 decibels; for 3300 mc., 2.3 db; and for 4700 mc., 4.5 db. The corresponding losses for good commercial coaxial cable of the same length would be 13 db for 1600 mc., 22 db for 3300 mc., and 30 db for 4700 mc. In the surface wave guide set-up above described at the lower frequencies the actual measured losses correspond rather closely to theoretical losses. However, at the highest frequency used the actual losses were higher than expected because the angle of the horns was too large for this high frequency, resulting in much lower efficiency of the horns. However, even under non-ideal operating conditions the attenuation in my open wave guide system is remarkably lower than would be present in coaxial cable. Furthermore, the flexibility of my system is evident from the fact that using the same horn, wire diameter and dielectric thickness, a very wide range of frequencies can be covered without excessive losses. This is true even though imperfect matching of the horn to the line causes disproportionate losses there.

Using the above operating set-up, for a very thin coating of dielectric on the conductor it is to be expected that the insertion loss will be large due to low efficiency of the horns. There is an optimum thickness for which the insertion loss will be a minimum. As the dielectric thickness is increased the total loss will be expected to rise slowly due to increased conductivity and dielectric losses.

Test results indicate that the expected variation in losses due to varying dielectric thickness do actually occur. Using the same horns as above described, a copper wire of 0.26 cm. diameter, and a frequency of 2600 mc., coats of polystyrene were progressively brushed on the conductor. The loss decreased to a minimum of 1.7 db. Further increases in the dielectric thickness resulted in very moderate increased power losses up to 0.2 db.

Tests also show that the dielectric thickness can vary along the length of the conductor by more than 10 to 1 without substantial deleterious effect.

It has been found to be particularly advantageous to have a thicker dielectric coating immediately in front of the horn. The thicker dielectric tends to concentrate the field more toward the surface line conductor, and hence more of the energy flowing along the open guide is encompassed by the mouth of the horn.

Tests made on a surface wave line 600 feet in length show that the physical support for such a long line involves no difficulties. The line was supported at intervals of about 80 feet by waxed strings, the distance to the earth varying from 4 to 8 feet. The supports themselves, and the bends in the line produced by the supports, were found to introduce no substantial effect on the attenuation.

The behavior of the above-described coated surface wave line under adverse weather conditions was found to be excellent. During rain an observable increase of the attenuation occurred only if the line was covered with rows of big raindrops. The maximum increase of the attenuation for the 120 foot line at an operating frequency of 1600 mc. was less than 1.5 db. A thin film of water did not increase the attenuation since, in effect, it enlarges the dielectric thickness. The water film behaves as a good dielectric because the ratio of power factor to ($\epsilon-1$) which determines the losses is very small.

As compared with the well-known hollow wave guide, the attenuation in a transmission system using my invention is of the same order of magnitude as the attenuation in a hollow wave guide at the frequency for which the hollow wave guide is designated to operate. However, a much wider range of frequencies can be covered with a single operating set-up of my invention compared with the frequency range of a given hollow wave guide.

Also, my invention is much less bulky physically and is lighter in weight. For example, about equal losses would result at 3000 megacycles per second for a rectangular wave guide 1½ inches by 3 inches in cross-section as with the same length of number 8 wire with a thin dielectric coating according to my invention.

While corrosion in a wave guide lowers its efficiency considerably it is not a serious factor in my surface wave transmission line, especially if a protective dielectric coating is provided on the open conductor.

In the use of my invention, conductivity losses can be appreciably reduced by increasing the wire diameter. However, if a hollow wave guide is progressively increased in size there are introduced other wave modes which cause much lower efficiency of the guide as a transmission medium, in addition to the added physical bulk because of increased size.

*Unmodified conductor*

Adequate, but less efficient, results for some purposes may be obtained by using a bare, unmodified wire in combination with the launching horn shown in Figures 8 and 9. Actually even for a bare conductor there is a microscopically thin dielectric layer present on its surface which tends to concentrate adjacent the conductor the field of the transmitted energy. For frequencies below about 5000 megacycles per second this minute surface layer is insufficient to shrink the radial extent of the field enough to permit the use of a bare conductor with a horn of convenient dimensions. However, at higher frequencies the required thickness of dielectric layer to accomplish a given amount of field concentration is lessened, and use of a bare conductor in combination with a conical horn is feasible. It will be understood that, for any given frequency of the transmitted energy, a considerably larger horn diameter will be required for a bare conductor than for a conductor with modified surface. This is because the shrinkage of the radial extent of the field depends upon the thickness of the dielectric layer on the conductor surface.

Figure 20:
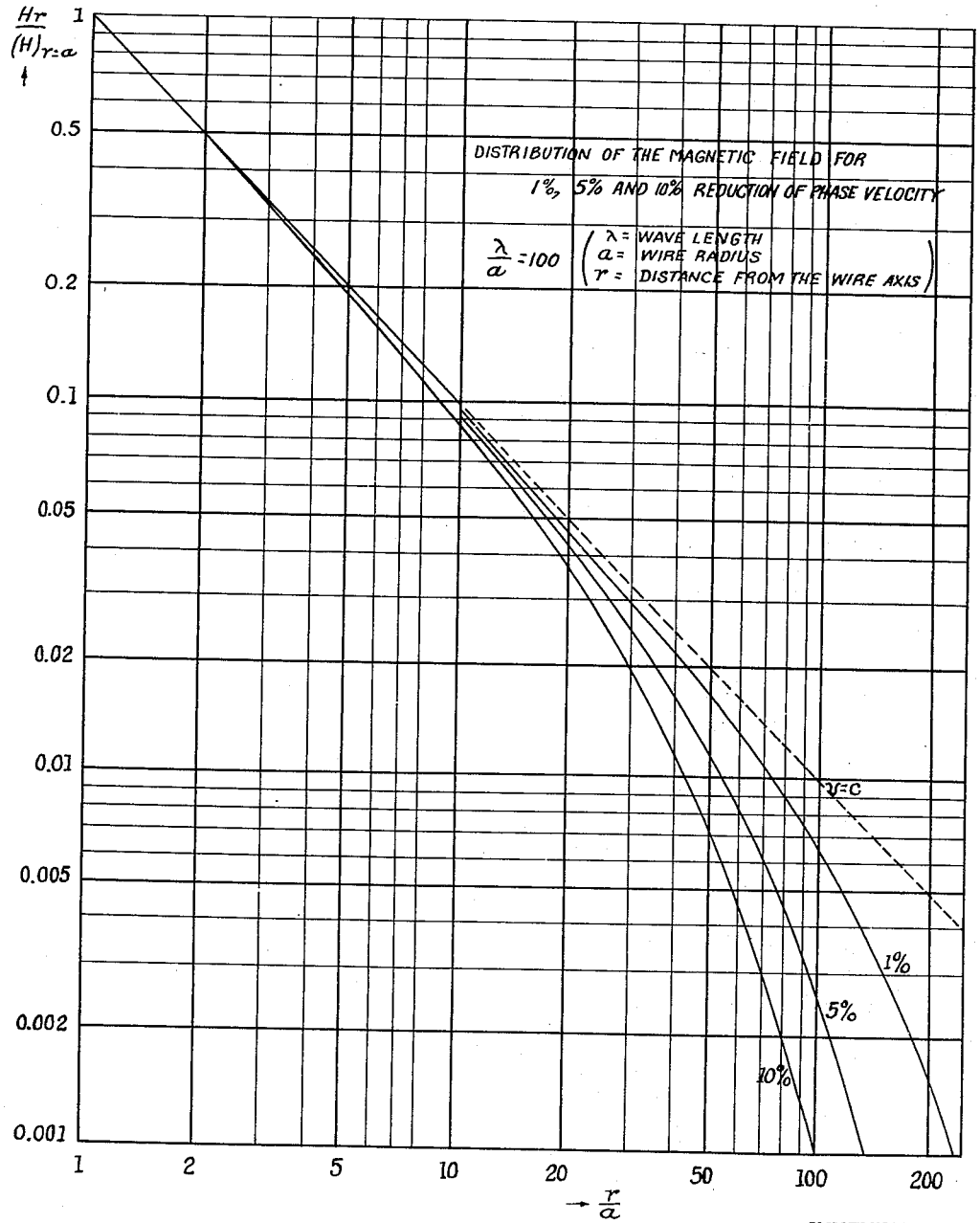
Figure 20 illustrates graphically the shrinkage of the radial field due to reducing the phase velocity of the transmitted energy.

Figure 20 shows how the field decreases with the distance from the wire. The ratio of the magnetic field strength at a distance from the wire to the magnetic field strength at the surface of the wire is plotted versus the distance from the wire, measured in multiples of the wire radius. Both scales are logarithmic. The dashed line indicates a $$\frac{1}{r}$$

decrease which would be present in the case of an uncoated wire with infinite conductivity. In this case, the phase velocity would be equal to the velocity of light, and, as previously mentioned, the power would be infinite if the field strength were finite. The solid line curves show how the field decreases if the phase velocity is reduced by 1%, 5% and 10%. Immediately adjacent the wire these curves follow the $$\frac{1}{r}$$

decrease, and at larger distances approach an exponential decrease. The more the phase velocity is reduced, the earlier the exponential decrease begins.

While the invention has been described with reference to particular embodiments, various other specific embodiments of my invention may suggest themselves to one skilled in the art without departing from the spirit of the invention. Therefore, I desire the present embodiments to be considered in all respects as illustrative and not restrictive, reference being had to the appended claims to indicate the scope of the invention.

Having thus described my invention, what I claim as new and desire to secure by Letters Patent is:

1. A transmission system for electromagnetic energy of a predetermined frequency range above 50 megacycles per second comprising elongated conductive means, surface conditioning means on said conductive means to reduce the phase velocity of the transmitted energy with respect to the velocity of light for concentrating the field of said energy at said frequency range substantially in the space outside of its conditioned surface, said field being substantially contained in a cylindrical space which at a frequency within said frequency range extends radially from said surface to a predetermined distance therefrom, and said field being propagated axially in a direction substantially parallel to said conductive means, means coupled to a source of electromagnetic energy for forming a beam of wave energy of substantially radially symmetrical field configuration and of a diameter substantially equal to that of a cylindrical space containing the field of a frequency within said frequency range, and directed axially into said cylindrical space, said conductive means being coupled to said beam forming means to cause substantially continuous transition from the field of said beam to that of said conductive means, and means remote from said beam forming means and coupled to said conductive means for translating the energy propagated along said conductive means.

2. The system of claim 1 wherein said surface conditioning means comprises a dielectric surrounding the outer surface of said conductive means in contact therewith, the transverse dimension of said dielectric being small with respect to the wave length of the energy.

3. An open wave guide for transmitting electromagnetic energy of a predetermined frequency range above 50 megacycles per second which comprises an elongated conductive means, surface conditioning means on said conductive means, the surface being conditioned to so reduce the phase velocity of the transmitted energy with respect to the velocity of light as to concentrate the field of the transmitted energy at said frequency range substantially in the space outside of said conditioned surface; said field being substantially contained in a cylindrical space which at a frequency within said frequency range extends radially from said conditioned surface to a predetermined distance therefrom, and said energy being propagated axially in a direction substantially parallel to said conductive means; and means for forming a beam of wave energy of substantially radially symmetrical field configuration and of a diameter substantially equal to that of a cylindrical space containing the field of a frequency within said frequency range and directed axially into said cylindrical space, said conductive means being coupled to said beam forming means to cause substantially continuous transition from the field of said beam to that of said conductive means.

4. In an open wave guide system for transmitting guided plane waves of electromagnetic energy of a predetermined frequency range above 50 megacycles per second, elongated electrically conductive means, means including a predetermined surface condition of said elongated conductive means to reduce the phase velocity of the transmitted energy with respect to the velocity of light for concentrating the field of said energy at said frequency range substantially in the space outside of said elongated conductive means, said field being substantially contained in a cylindrical space which at a frequency within said frequency range extends radially from said conditioned surface to a predetermined distance therefrom, and said energy being propagated axially in a direction substantially parallel to said conductive means; means for forming a beam of wave energy of substantially radially symmetrical field configuration and of a diameter substantially equal to that of a cylindrical space containing the field of a frequency within said frequency range and directed axially into said cylindrical space; and means for coupling said beam forming means and said conductive means including a connection to said conductor means arranged axially with respect to said beam.

5. Apparatus as claimed in claim 4 further characterized in that said elongated conductive means consists of a single conductor which is non-circular in cross-section and twisted along its length.

6. Apparatus as claimed in claim 4 further characterized in that said elongated conductive means consists of a plurality of elongated conductors twisted along their length.

7. An open wave guide system for a predetermined frequency range comprising a conductive wire line, means for launching a beam of wave energy of substantially transverse magnetic mode symmetrically coaxial with said line, said wire line being coupled to said launching means to cause substantially continuous transition from the field of said beam to that of said wire line, and means on said wire line comprising a predetermined surface condition for reducing the phase velocity of said wave energy to a value slightly less than the velocity of light, to propagate said wave energy in non-radiating mode substantially in the space outside of said wire and in the direction of said wire, said energy being contained substantially within a predetermined cylindrical space coaxial and coextensive with said wire at a frequency within said frequency range and of a diameter substantially equal to that of said beam at a frequency within said frequency range.

8. An energy translation system for a predetermined frequency range comprising a source of electromagnetic wave energy and a receiver therefor, an elongated conductor extending between said source and said receiver, surface conditioning means on said conductor for reducing the phase velocity of the transmitted waves slightly below the velocity of light in the medium which surrounds said conductor to propagate wave energy substantially in the space outside of its conditioned surface and in a direction substantially parallel to said conductor, said energy being confined at a frequency within said frequency range substantially within a predetermined cylindrical space coaxial and coextensive with said conductor; and separate means at the source and at the receiver respectively for coupling energy to said conductor, said coupling means including means for forming a beam of wave energy of substantially radially symmetrical field configuration and of a diameter substantially equal to that of a cylindrical space containing the field of a frequency within said frequency range and directed axially into said cylindrical space, said conductor being coupled to said beam forming means to cause substantially continuous transition from the field of said beam to that of said conductor.

9. In combination, an electromagnetic horn, an elongated conductor extending coaxially with said horn, and conditioned on its surface to reduce the phase velocity of the transmitted energy with respect to the velocity of light for propagating wave energy of a predetermined frequency range substantially in the space outside of said conditioned surface and in a direction substantially parallel to said conductor, said energy being contained at a frequency within said frequency range substantially within a cylindrical space coaxial and coextensive with said conductor, and of a diameter substantially equal to that of said horn at a frequency within said frequency range, a coaxial line comprising inner and outer conductors, the outer conductor of said coaxial line being electrically connected to said horn for energy coupling thereto, and means forming an energy coupling between the inner conductor of said coaxial line and said elongated conductor.

10. Combination according to claim 9 wherein said last mentioned means are adapted to permit movement of said elongated conductor relative to the horn.

11. In combination, an electromagnetic horn comprising a rear portion of substantially uniform cross-section and a forward outwardly flared portion, said rear portion of the horn being formed with an aperture, a coaxial line comprising inner and outer conductors, the outer portion of said coaxial line being joined to said horn about said aperture, the inner conductor of said coaxial line extending through said aperture into the horn, an elongated conductor extending within said horn coaxial therewith, and conditioned on its surface to reduce the phase velocity of the transmitted energy with respect to the velocity of light for propagating wave energy of a predetermined frequency range in the space substantially outside of said conditioned surface and in a direction substantially parallel to said elongated conductor; said energy being contained at a frequency within said frequency range substantially within a cylindrical space coaxial and coextensive with said elongated conductor, and of a diameter at a frequency within said frequency range substantially equal to that of said forward portion of said horn, means within said horn forming an energy coupling between said elongated conductor and the inner conductor of said coaxial line, said means permitting movement of said elongated conductor relative to the horn, and means within said horn remote from the flared end and forming a quarter wavelength trap adjacent the coupling to the coaxial line.

12. In combination, a coaxial line, an open wave guide comprising an elongated conductor, means coupling said coaxial line and said open wave guide for launching a beam of wave energy of a predetermined frequency range symmetrically coaxial with said elongated conductor, and means on said elongated conductor comprising a predetermined surface condition for reducing the phase velocity of said wave energy to such value less than the velocity of light as to propagate said wave energy in non-radiating mode substantially in the space outside of said conductor in a direction substantially parallel to said conductor; said energy being contained substantially in a cylindrical space coaxial and coextensive with said conductor at a frequency within said frequency range, and of a diameter substantially equal to that of said beam at a frequency within said frequency range; and said elongated conductor being coupled to said launching means to cause substantially continuous transition from the field of said beam to that of said conductive means.

13. The combination defined in claim 12 wherein said coupling means is further characterized in that said elongated conductor is unitarily connected to the inner conductor of said coaxial line and extending coaxially with said inner conductor of the coaxial line, and a plurality of electrically conductive segments are unitarily connected to the outer conductor of said coaxial line adjacent the termination thereof, said segments being flared outwardly from the axis of said coaxial line along the direction of the elongated conductor.

14. The combination defined in claim 12 further characterized in that dielectric material is interposed between said inner and outer conductors of said coaxial line, said outer conductor terminating at a point beyond which said inner conductor extends, said inner conductor being provided with a thin dielectric coating outwardly from a point at several wave lengths of the transmitted energy beyond the termination of said outer conductor, whereby said coated inner conductor forms said conditioned elongated conductor outwardly from said point at several wave lengths beyond the termination of said conductor, and a tapered dielectric section unitarily joining the dielectric within the coaxial line and the thin dielectric coating on said elongated conductor.

15. The system defined in claim 12 further characterized in that said coupling means comprises an electromagnetic horn, said horn having a rear portion of substantially uniform cross-section and a forward outwardly flared portion, said rear portion of the horn being formed with an aperture, the outer conductor of said coaxial line being joined to said horn about said aperture, the inner conductor of said coaxial line extending through said aperture into said horn, said elongated conductor extending within said horn coaxial therewith, means within said horn forming an energy coupling between said elongated conductor and the inner conductor of said coaxial line, said energy coupling means providing for movement of said elongated conductor relative to said horn, and means within said horn remote from the flared end forming a quarter wave length trap adjacent the coupling to said coaxial line.

16. The combination defined in claim 12 further characterized in that said coupling means comprises an electromagnetic horn electrically connected to said outer coaxial conductor and tapering outwardly therefrom, said elongated conductor extending coaxially with said horn and extending outwardly beyond the mouth of said horn, and means for electrically coupling said elongated conductor to said inner conductor of said coaxial line.

17. The system defined in claim 12 further characterized in that said surface conditioning means comprises a dielectric surrounding the periphery of said elongated conductor and in contact therewith, the thickness of said dielectric being small with respect to the wave length of the energy from said source.

18. The combination defined in claim 12 further characterized in that said coupling means provides for movement of said elongated conductor relative to said horn.

19. An energy translation system for a predetermined frequency range comprising a source of electromagnetic wave energy and a receiver therefor, an elongated conductor extending between said source and said receiver, surface conditioning means on said conductor for reducing the phase velocity of the transmitted energy slightly below the velocity of light in the medium which surrounds said conductor to propagate said wave energy substantially in the space outside of the conditioned surface and in a direction substantially parallel to said elongated conductor, said energy being contained substantially in a cylindrical space substantially coaxial and coextensive with said elongated conductor at a frequency within said frequency range and separate means at the source and at the receiver respectively for coupling energy to said elongated conductor; each of said coupling means comprising a truncated conical electromagnetic horn coaxial with said elongated conductor, the mouth of said horn having a diameter substantially coinciding with that of a cylindrical space containing the field of a frequency within said frequency range; and a coaxial line section comprising inner and outer conductors, said horn tapering inwardly from its mouth to an electrical connection with the outer conductor of said coaxial line section, and the inner conductor of said coaxial line section being electrically connected to said elongated conductor.

20. In an open wave guide system for transmitting guided plane waves of electromagnetic energy at a predetermined frequency range above 50 megacycles per second, a circular conductor and a dielectric surrounding the outer surface of the conductor in contact therewith, the thickness of said dielectric being small with respect to the wave length of the transmitted energy, the radius of said conductor and the thickness of said dielectric being such that $$ln\frac{a'}{a} = -\frac{\epsilon_d}{\epsilon} \cdot \frac{b^2}{b_d^2} \cdot ln 0.89 b.a'$$

where $a$ is the conductor radius, $a'$ represents the conductor radius plus the thickness of the dielectric, $\epsilon_d$ represents the dielectric constant of the dielectric, $\epsilon$ represents the dielectric constant of the medium surrounding the wave guide, $b$ and $b_d$ represent positive real quantities defined by the equations $b^2 = h^2 - k^2$ and $b_d^2 = k_d^2 - h^2$ where $h$ is the propagation constant of the wave guide and $k = \omega\sqrt{\mu\epsilon}$ and $k_d = \omega\sqrt{\mu_d\epsilon_d}$ where $\omega$ is the frequency in radians per second, $\mu$ the permeability of the medium surrounding the guide and $\mu_d$ the permeability of said dielectric; whereby to propagate said wave energy substantially in the space outside of said dielectric in a direction subtsantially parallel to said conductor, said energy being confined substantially within a cylindrical space coaxial and coextensive with said conductor at a frequency within said frequency range; means for forming a beam of wave energy of a cross-section substantially coinciding with that of a cylindrical space containing the field of a frequency within said frequency range and axially directed into said cylindrical space, and means for coupling said beam forming means to said conductor, including a connection to said conductor arranged axially with respect to said beam.

21. In an electromagnetic wave energy transmission system, elongated conducting means conditioned on its outer surface to reduce the phase velocity of the transmitted energy with respect to the velocity of light for transmitting substantially only a non-radiating mode of wave field energy of a predetermined frequency range substantially in the space outside of said conditioned surface and in a direction substantially parallel to said elongated conducting means, said energy being contained substantially within a cylindrical space coaxial and coextensive with said elongated conducting means at a frequency within said frequency range, and means for forming a beam of wave field energy of substantially radially symmetrical field configuration of a diameter substantially equal to that of a cylindrical space containing the field of a frequency within said frequency range and directed axially into said cylindrical space, the interface of the two wave energy fields being of the order of wave length dimension; and said conducting means being coupled to said beam forming means to cause substantially continuous transition from the field of said beam to that of said conductive means.

22. A system in accordance with claim 21 wherein said beam forming means includes a conducting surface in the shape of a truncated cone.

23. A system according to claim 21 wherein said beam forming means includes a tapered dielectric.

24. A system according to claim 21 comprising means for supplying wave field energy to said beam forming means and wherein said beam forming means includes a horn increasing in diameter from said supply means, said interface being formed by the mouth of said horn.

25. A system according to claim 21 comprising means for supplying wave field energy to said beam forming means, said beam forming means including a tapered dielectric decreasing in diameter from said supply means to said conducting means.

26. A system according to claim 21 comprising means for withdrawing wave field energy from said elongated conducting means, said withdrawing means including a horn with the mouth of said horn facing said means for forming a beam and with said elongated conducting means extending within said horn.

27. A system according to claim 21 comprising means for withdrawing wave field energy from said elongated conducting means, said withdrawing means including a section of tapered dielectric having its end of minimum diameter facing said means for forming a beam.

28. In an electromagnetic wave energy transmission system, means for supplying concentrated wave energy of a predetermined frequency range, elongated conducting means conditioned on its outer surface to reduce the phase velocity of the transmitted energy with respect to the velocity of light for transmitting substantially only a non-radiating mode of wave energy substantially in the space outside of the said conditioned surface and in a direction substantially parallel to said elongated conducting means, said energy being contained substantially within a cylindrical space coaxial and coextensive with said elongated conducting means at a frequency within said frequency range; and means coupled to said supplying means for forming said concentrated wave energy into a beam of wave energy of substantially radially symmetrical field configuration of a diameter substantially equal to that of a cylindrical space containing the field of a frequency within said frequency range and coaxially directed into said cylindrical space, said conducting means being coupled to said beam forming means to cause substantially continuous transition from the field of said beam to that of said conductive means.

29. A system according to claim 28 wherein said beam forming means includes a horn with the mouth of said horn facing said elongated conducting means and with said elongated conducting means extending within said horn.

30. A system according to claim 28 wherein said surface is coated with a nonconductor to reduce the phase velocity of the non-radiating wave as compared with the velocity on an uncoated surface.

31. A system according to claim 28 wherein said beam forming means includes a tapered section of dielectric having its end of minimum radius facing the elongated conducting means.

32. A system according to claim 28 wherein said supplying means includes a coaxial line, and said beam forming means includes a horn comprising a rear portion of substantially uniform cross section and a forward gradually outwardly flared portion the elongated conducting means extending within the forward portion of said horn.

33. A system according to claim 32 comprising means within said horn remote from the flared end and forming a quarter wave length trap adjacent the coaxial line.

34. A transmission system for electromagnetic energy of a predetermined frequency range above 50 megacycles per second comprising elongated conductive means, surface conditioning means on said conductive means for providing an energy path along said conducting means, reducing the phase velocity of the transmitted energy with respect to the velocity of light and confining the transmitted energy at said frequency range substantially in the space outside of its conditioned surface and within a cylindrical space which at a frequency within said frequency range extends radially symmetrically from said surface to a predetermined distance therefrom, said field being propagated axially in a direction substantially parallel to said conductive means, means coupled to a source of electromagnetic energy for forming a beam of wave energy of substantially radially symmetrical field configuration of a diameter substantially equal to that of a cylindrical space containing the field of a frequency within said frequency range and directed axially into said cylindrical space, means for coupling said beam forming means to said conductive means including a conductor axially disposed with respect to said beam, and means remote from said beam forming means and coupled to said conductive means for translating the energy propagated along said elongated conductive means.

35. An open wave guide system for a predetermined frequency range comprising a conductive wire line, means for launching a beam of wave energy of substantially transverse magnetic mode symmetrically coaxial with said line, said launching means including a conductor coupled to said wire line and axially arranged with respect to said beam, and means on said wire line comprising a predetermined surface condition for reducing the phase velocity of said wave energy to a value slightly less than the velocity of light, to provide an energy path substantially in the space outside of said wire, propagating said energy in non-radiating mode substantially in the direction of said wire and confining said energy substantially within a predetermined cylindrical space coaxial and coextensive with said wire at a frequency within said frequency range and of a diameter substantially equal to that of said beam at a frequency within said frequency range.

(References on following page)

References Cited in the file of this patent

UNITED STATES PATENTS

| Number | Name | Date |
|---|---|---|
| 2,438,795 | Wheeler | Mar. 30, 1948 |
| 2,659,817 | Cutler | Nov. 17, 1953 |

OTHER REFERENCES

"Science Abstracts," vol. II, 1899 (April), Gresham Press, London, pp. 233–234. (Copy in Scientific Library.)

"Principles and Practice of Wave Guides," L. G. H. Huxley, 1947, MacMillan Co., pp. 198–203.